(12) United States Patent
Hayashide (10) Patent No.: US 7,847,988 B2
(45) Date of Patent: Dec. 7, 2010

(54) IMAGE READING APPARATUS

(75) Inventor: Tadao Hayashide, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1010 days.

(21) Appl. No.: 11/436,155

(22) Filed: May 17, 2006

(65) Prior Publication Data

US 2006/0268367 A1 Nov. 30, 2006

(30) Foreign Application Priority Data

May 26, 2005 (JP) ............................. 2005-153932

(51) Int. Cl.
*H04N 1/46* (2006.01)
(52) U.S. Cl. ...................... 358/506; 358/474; 358/505; 358/514; 358/516
(58) Field of Classification Search .................. 358/474, 358/506, 514, 516, 448, 475, 509
See application file for complete search history.

(56) References Cited

U.S. PATENT DOCUMENTS

| | | | |
|---|---|---|---|
| 5,724,152 A * | 3/1998 | Hayashi et al. | 358/296 |
| 6,462,866 B1 | 10/2002 | Sugiyama et al. | |
| 6,493,061 B1 | 12/2002 | Arita et al. | |
| 6,590,679 B1 | 7/2003 | Edgar et al. | |
| 6,891,645 B1 * | 5/2005 | Nakamura | 358/474 |
| 2003/0132384 A1 | 7/2003 | Sugiyama et al. | |
| 2003/0234966 A1 * | 12/2003 | Tochigi et al. | 358/514 |

FOREIGN PATENT DOCUMENTS

JP          10-325921 A       12/1998

OTHER PUBLICATIONS

Keisuke Araki Paraxial and Aberration Analysis of Off-Axial Optical Syatems Dec. 21, 2004 Optics Technology Research Center, Canon Inc. 23-10 Kiyohara-Kogyodanchi, UtSunomiya 321-3298, Japan Optcal, Review vol. 12, No. 3, 219-222.*

* cited by examiner

*Primary Examiner*—Benny Q Tieu
*Assistant Examiner*—Ngon Nguyen
(74) *Attorney, Agent, or Firm*—Canon U.S.A., Inc. I.P. Division (57) ABSTRACT

An image reading apparatus includes a visible light source; an infrared light source; at least three one-dimensional photoelectric conversion elements extending in a main scanning direction and having respective different spectral sensitivity characteristics; an imaging optical system configured to form an image of image information of an original placed on an original holder and irradiated by the visible light source and the infrared light source on the one-dimensional photoelectric conversion elements; a driving unit configured to change relative optical positions of the imaging optical system and the original in a sub-scanning direction; and a control unit configured to obtain visible-light image information and infrared-light image information of the original by controlling turning-on operations of the visible light source and the infrared light source at every reading in the main scanning direction and by performing relative movement of the image optical system and the original in the sub-scanning direction.

12 Claims, 8 Drawing Sheets

| | NUMBER OF TIMES OF SUB-SCAN | NUMBER OF TIMES OF MAIN SCAN ON A VISIBLE IMAGE | COST OF IMAGE FORMING SYSTEM | COST OF CCD | OTHER COSTS |
|---|---|---|---|---|---|
| PRESENT INVENTION | A<br>ONE TIME | A<br>ONE TIME | A | A | A |
| TWO-TIMES SUB-SCANNING METHOD | C<br>TWO TIMES | A<br>ONE TIME | A | A | B<br>FOCUS POSITION ADJUSTMENT UNIT |
| ONE-TIME SUB-SCANNING METHOD BY SEQUENTIALLY SWITCHING LED | A<br>ONE TIME | C<br>THREE TIMES | C | A | C<br>LIGHTING SOURCE |
| ONE-TIME SUB-SCANNING METHOD USING A SPECIFIC CCD | A<br>ONE TIME | A<br>ONE TIME | A | C | C<br>FILTER ELEMENT |

IMAGE READING APPARATUS

BACKGROUND OF THE INVENTION

1. Field of the Invention

The present invention relates to an image reading apparatus, and in particular, to an image reading apparatus capable of obtaining both visible-light image information and infrared-light image information of an original. The image reading apparatus can be applied to, for example, an image scanner, a digital copying machine, or a facsimile machine.

2. Description of the Related Art

An image reading apparatus converts image information of a transmissive-type original (transmission original) into an electric signal to be loaded into a computer. Various proposals have been made on an image reading apparatus which obtains information on foreign matters and flaws on an original using infrared light and corrects the corresponding portion of visible-light image information on the original.

In U.S. Patent Application Publication No. US 2003/0132384 A1 and U.S. Pat. No. 6,493,061, an existent monolithic three-line sensor (a three-line CCD), an infrared light source, a visible light source, an imaging optical system, a focus adjustment unit, and a reading unit are used to obtain visible-light image information and infrared-light image information by performing sub-scan (reading in the sub-scanning direction) two times. Hereinafter, this scanning method is referred to as a "two-times sub-scanning method".

In addition, an image reading apparatus in which LED (light-emitting diode) light sources are switched sequentially at each main scan (a reading in the main scanning direction) and visible-light image information and infrared-light image information are obtained by conducting a sub-scan once is proposed. Hereinafter, this scanning method using LED light sources is referred to as a "one-time scanning method by sequentially switching LED".

According to the above image reading apparatus, both visible-light image information and infrared-light image information can be obtained in one sub-scanning by using an existent one-line sensor (one-line CCD), four light sources that emit light of four different wavelengths corresponding to red (R), green (G), blue (B), and infrared (IR), and an imaging optical system. The one-time scanning method by sequentially switching LED is advantageous over the two-times sub-scanning method in that the read time, component precision, and adjustment accuracy can be improved.

Furthermore, an image forming apparatus which obtains both visible-light image information and infrared-light image information of an original in one sub-scanning by a method of reading the image information by light of wavelengths corresponding to R, G, B, and IR simultaneously, using a specific, monolithic four-line sensor (four-line CCD), is discussed (refer to U.S. Pat. No. 6,590,679). Hereinafter, this scanning method using a specific four-line CCD will be referred to as a "one-time sub-scanning method using a specific CCD".

Figure 7:
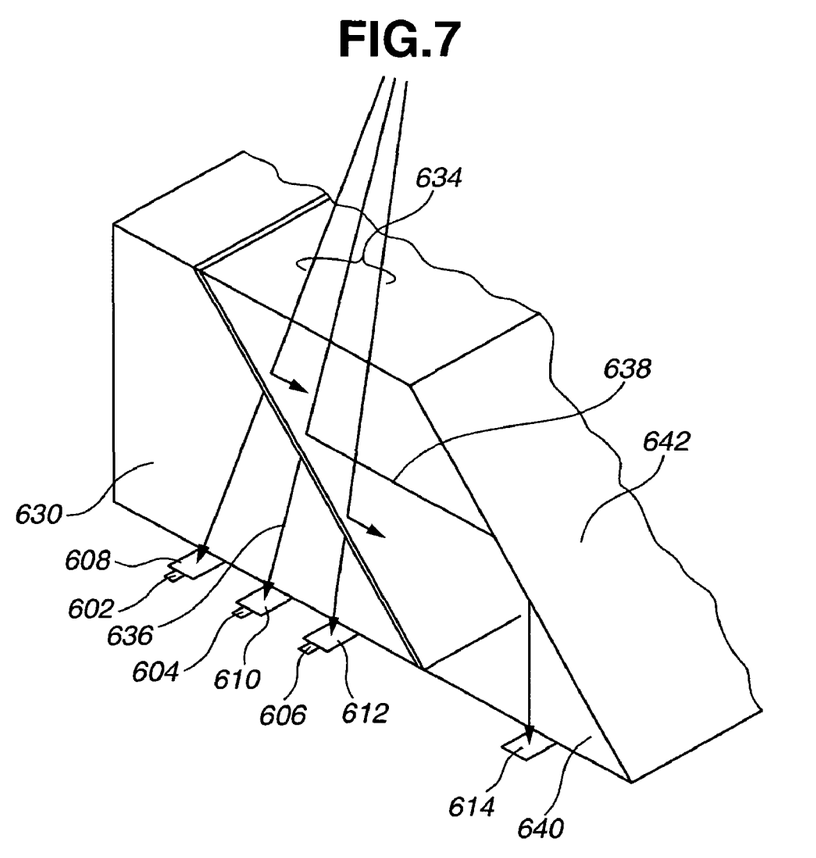
FIG. 7 is a schematic diagram of exemplary portions of a conventional image reading apparatus.

FIG. 7 is a schematic diagram of essential portions of an image forming apparatus employing the one-time sub-scanning method using a specific CCD discussed in U.S. Pat. No. 6,590,679. According to U.S. Pat. No. 6,590,679, image information by light of wavelengths corresponding to R, G, B, and IR can be received simultaneously using a specific four-line CCD. Moreover, filter lines 608, 610, and 612 placed in the vicinity of a four-line CCD block infrared light from reaching R, G, and B sensor lines 602, 604, and 606, and block visible light from reaching an IR sensor line 614. At the same time, the chromatic aberration by infrared light is corrected by employing a filter with a specific configuration, and image information by light of wavelengths corresponding to R, G, B, and IR together is formed on the surface of the four-line CCD. As a result, both visible-light image information and infrared-light image information can be obtained in one sub-scan. Thus, the one-time sub-scanning method using a specific CCD is advantageous over the two-times sub-scanning method in that the read time, component precision, and adjustment accuracy can be improved.

In addition, by employing a lighting system which has a simple configuration of only continuously turning on a light source which emits visual light and infrared light, the lighting system can be manufactured more easily (at a lower cost) compared to the one-time sub-scanning method by sequentially switching LED. Furthermore, U.S. Pat. No. 6,590,679 discloses an embodiment in which a light bulb is used. A representative example of a light bulb that is used in an image reading apparatus is a halogen lamp. The halogen lamp emits large amounts of both infrared light and visible light, and can be easily manufactured (the cost is comparatively low). Moreover, the reference has many advantages such as conducting chromatic aberration correction by a filter line in the vicinity of a sensor so that an image reading optical system can be easily designed.

In FIG. 7, a light flux 634 comes from an original (not shown). The light flux 634 includes visible light 636 and infrared light 638. A second prism 640 transmits the visible light 636 and reflects the infrared light 638. A first prism 630 transmits the visible light 636. The infrared light 638 is reflected by a reflection surface 642 of the second prism 640.

In U.S. Patent Application Publication No. US 2003/0132384 A1 and U.S. Pat. No. 6,493,061 that employ the two-times sub-scanning method, since there is a backlash of the driving device which drives the carriage in the sub-scanning direction and deterioration over time occurs due to the thermal expansion of the whole system, it is necessary to restore the initial state of the optical system and perform an accurate positioning after the first sub-scan is finished. Therefore, the configuration becomes complex in order to improve the read time, component precision, and adjustment accuracy. Furthermore, by using a chromatic aberration correction unit (focus position adjustment unit), the structure becomes complicated (increasing the cost), and the entire apparatus becomes larger.

For an image reading apparatus using the one-time sub-scanning method by sequentially switching LED to read image information by light of wavelengths corresponding to R, G, and B, it is necessary to conduct reading in the main scanning direction by sequential switching. Therefore, a period of time required for reading visible-light image information becomes longer than that in the two-times sub-scanning method in which image information by light corresponding to wavelengths of R, G, and B is read simultaneously. In addition, the luminous efficiency of a LED light source is lower than that of other light sources such as a fluorescent tube. Therefore, in an image reading apparatus which reads a plurality of lines of film simultaneously, the lighting range becomes wide and the luminance becomes insufficient. Therefore, it becomes necessary to increase the number of LEDs to be installed. However, LEDs, in particular, blue LEDs, are difficult to manufacture (and therefore costly). Thus, using a large number of LEDs greatly increases production cost.

Moreover, for example, Japanese Patent Application Laid-Open No. 10-325921 discusses an imaging optical system in which the chromatic aberration is corrected by optimizing glass material, to form both image information by light of wavelengths corresponding to R, G, and B and infrared-light image information on the surface of a one-line CCD. However, the design of an imaging optical system capable of reading a plurality of lines of film simultaneously is difficult, and the number of lens elements greatly increases.

Therefore, an image reading apparatus employing the one-time sub-scanning method by sequentially switching LED is adequate to be applied to a film scanner for 35 mm film, because an image reading optical system and a light source do not become a heavy load. However, the manufacturing is difficult and the configuration becomes complex for applying to an apparatus which reads a wider width. In addition, in the above image reading apparatus, the number of times of sub-scan to obtain visible-light image information and infrared-light image information of an original is one. However, since image information by light of wavelengths corresponding to R, G, and B cannot be read simultaneously, the entire read time can not be considered short.

The manufacturing of a specific four-line CCD and filter lines discussed in U.S. Pat. No. 6,590,679 which employs the one-time sub scanning method using a specific CCD has the following problems. First, as for the filter lines, it is difficult to completely block visible light and infrared light, and there will be some leaking light. On the other hand, image reading apparatuses in recent years have a high gradation specification of approximately 8 bits, and even if it is considered that a noise component of 1 bit is allowable in general, the rate of leaking light is required to be less than or equal to $\frac{1}{2}^{(8-1)}$ =0.8%. However, a filter line which meets this requirement is not easy to manufacture. For example, a specific dielectric multilayer structure as discussed in U.S. Pat. No. 6,462,866 may be incorporated in the filter line. Nevertheless, the manufacturing is still difficult.

In the case where the chromatic aberration correction is conducted by a filter line, considering that the amount of color deviation within a glass medium is generally 0.7 to 1.0 mm, the R, G, B sensor lines and the infrared sensor line need to be placed apart by that distance. Since the effective width of a conventional three-line sensor composed of R, G, and B sensors is approximately 0.5 mm, the device area greatly increases. Since the production yield of a device in a semiconductor process depends greatly on the area of the device, it can be foreseen that the cost will also increase greatly. Furthermore, there are also many issues by which a decrease in the yield can be expected, such as positioning the edge of the dielectric multilayer structure at an angle within a space of 0.7 to 1.0 mm, and aligning accurately with the CCD surface.

Moreover, an image reading apparatus employing the one-time sub-scanning method using a specific CCD can obtain visible-light image information and infrared-light image information of an original in one sub-scan, use a conventional reading optical system, and use a simple (low-cost) light source such as a halogen lamp. However, the manufacturing of a specific CCD and filter lines associated therewith becomes difficult.

SUMMARY OF THE INVENTION

The present invention is directed to an image reading apparatus configured to be capable of obtaining both visible-light image information and infrared-light image information of an original in one sub-scan at high speed and with a simple configuration.

In a first exemplary embodiment of the present invention, an image reading apparatus includes a visible light source configured to emit visible light, an infrared light source configured to emit infrared light, at least three one-dimensional photoelectric conversion elements extending along a main scanning direction and having respective different spectral sensitivity characteristics, an imaging optical system configured to form an image of image information of an original placed on an original holder and irradiated by the visible light source and the infrared light source on the at least three one-dimensional photoelectric conversion elements, a driving unit configured to change relative positions of the imaging optical system and the original in a sub-scanning direction, and a control unit configured to perform an operation of obtaining visible-light image information of the original while turning on the visible light source with the infrared light source turned off and an operation of obtaining infrared-light image information of the original while turning on the infrared light source with the visible light source turned off, at every reading in the main scanning direction.

In a second exemplary embodiment of the present invention, an image reading apparatus includes a visible light source configured to emit visible light, an infrared light source configured to emit infrared light, at least three one-dimensional photoelectric conversion elements extending along a main scanning direction and having respective different spectral sensitivity characteristics, an imaging optical system configured to form an image of image information of an original placed on an original holder and irradiated by the visible light source and the infrared light source on the at least three one-dimensional photoelectric conversion elements, a driving unit configured to change relative positions of the imaging optical system and the original in a sub-scanning direction, and a control unit configured to perform an operation of obtaining visible-light image information of the original while turning off the infrared light source with the visible light source turned on and an operation of obtaining visible-light image information and infrared-light image information of the original while turning on the infrared light source with the visible light source turned on, at every reading in the main scanning direction.

In yet a third exemplary embodiment of the present invention, an image reading apparatus includes a visible light source configured to emit visible light, an infrared light source configured to emit infrared light, at least three one-dimensional photoelectric conversion elements extending along a main scanning direction and having respective different spectral sensitivity characteristics, an imaging optical system configured to form an image of image information of an original placed on an original holder and irradiated by the visible light source and the infrared light source on the at least three one-dimensional photoelectric conversion elements, a driving unit configured to change relative positions of the imaging optical system and the original in a sub-scanning direction, and a control unit configured to perform an operation of obtaining infrared-light image information of the original while turning off the visible light source with the infrared light source turned on and an operation of obtaining visible-light image information and infrared-light image information of the original while turning on the visible light source with the infrared light source turned on, at every reading in the main scanning direction.

Accordingly, with regard to the present invention, both visible-light image information and infrared-light image information of an original can be obtained at high speed by using a one-time sub-scanning method which is different from the one-time sub-scanning method by sequentially switching LED or the one-time sub-scanning method using a specific CCD. In addition, an image reading apparatus which has high accuracy and sufficient high-speed performance can be achieved using a line CCD, a light source, and an imaging optical system that are easy to manufacture.

Further aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Numerous exemplary embodiments, features and aspects of the present invention will now be herein described in detail below with reference to the drawings.

First Exemplary Embodiment

Figure 1:
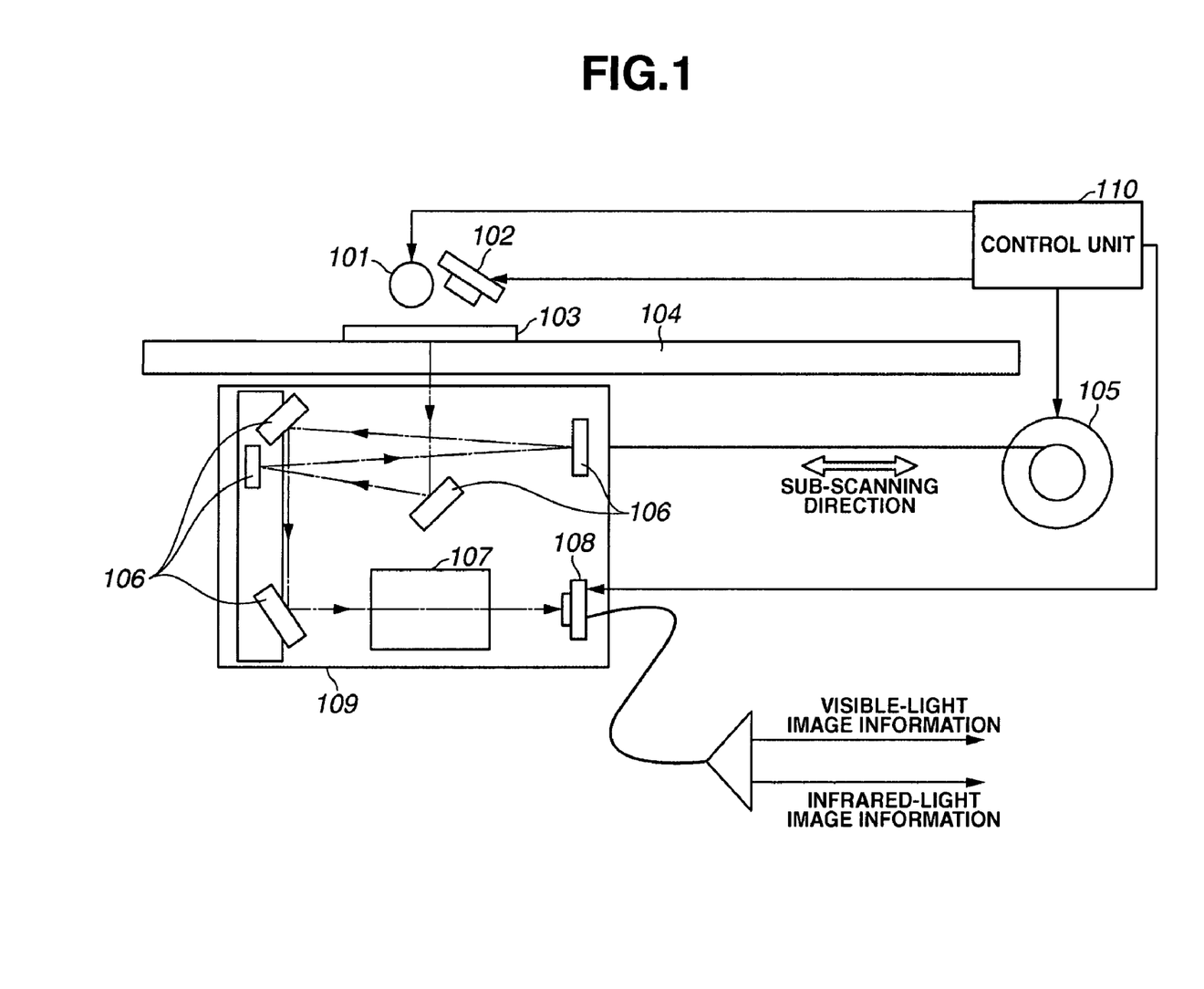
FIG. 1 is a schematic diagram of exemplary portions of an image reading apparatus according to a first embodiment of the present invention.

FIG. 1 is a schematic diagram of exemplary portions of an integrated-carriage-type image reading apparatus (a flatbed scanner) according to a first embodiment of the present invention. A visible light source 101 includes a fluorescent tube containing xenon gas and emits visible light of wavelengths of at least 480 nm to 630 nm. An infrared light source 102 includes an infrared LED array and emits infrared light of which the peak wavelength is between 800 nm to 950 nm. A transmission original (film) 103 is placed on an original holder glass 104.

A carriage 109 fixedly holds a plurality of reflex mirrors 106, an imaging optical system (lens) 107, and a read unit 108, to be described later. The carriage 109 is driven in the sub-scanning direction as in FIG. 1 by a driving device 105 such as a motor, to obtain (read) visible-light image information and infrared-light image information of the original 103 in accordance with processes described in the flowchart shown in FIG. 2. The read visible-light image information and infrared-light image information is transmitted to an external apparatus, such as a personal computer, via an interface.

Still referring to FIG. 1, the plurality of reflex mirrors 106 bends the optical path of a light flux from the original 103 inside the carriage 109. The imaging optical system 107 includes one or more lens elements and forms image information of the original 103, placed on the original holder glass 104, irradiated by the visible light source 101 and the infrared light source 102 on the read unit 108.

An off-axial reflecting optical system may be used as the imaging optical system 107 in the present embodiment. An off-axial reflecting optical system is an optical element which forms a light flux into an image by the action of a free-shaped reflection surface, and does not generate chromatic aberration. The reflective surface material may be metal or plastic, thus having a high degree of freedom. Therefore, the off-axial reflecting optical system can be easily fabricated (at low cost).

The read unit 108 has at least three different spectral sensitivity characteristics and includes a plurality of one-dimensional photoelectric conversion elements (hereinafter referred to as a "three-line CCD (Charge Coupled Device)") extending along the main scanning direction. The driving device 105 moves the carriage 109 (the imaging optical system 107) and the original 103 relative to each other in the sub-scan direction. Consequently, the relative optical positions of the imaging optical system 107 and the original 103 are changed in the sub-scanning direction.

In the present embodiment, visible-light image information and infrared-light image information of the original 103 are sequentially obtained at high speed from the three-line CCD 108 by switching the turning-on operation of the visible light source 101 and the infrared light source 102 at every reading (one main scan) in the main scanning direction in accordance with a control signal sent from a control unit 110, and by changing the relative positions of the carriage 109 (the imaging optical system 107) and the original 103 in the sub-scanning direction once. The obtained visible-light image information and infrared-light image information are used to correct defects in image information read by visible light on the basis of area information of foreign matters or flaws on the original read by infrared light.

Figure 2:
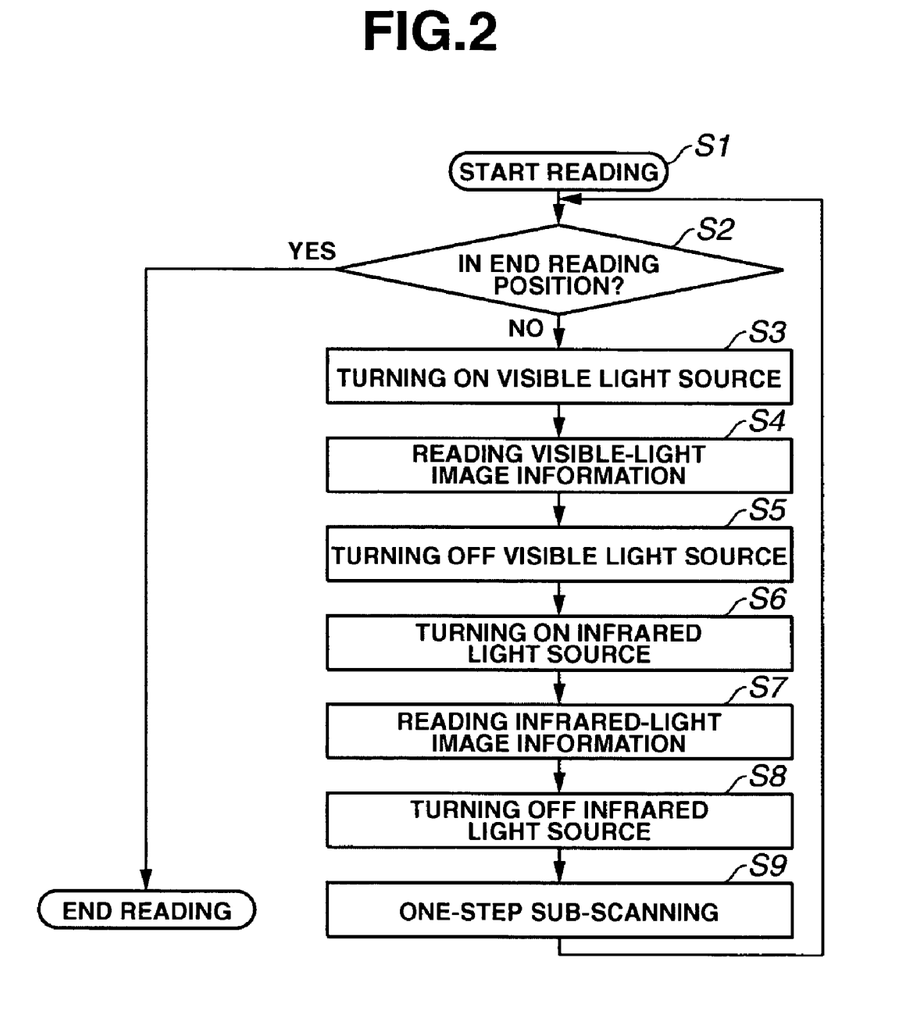
FIG. 2 is a flowchart showing an exemplary operation of the image reading apparatus according to the first embodiment of the present invention.

FIG. 2 is a flowchart illustrating an exemplary operation of the image reading apparatus according to the first embodiment. First, the reading operation on the original 103 is started (step S1). Next, a check is made to determine whether the reading operation in the sub-scanning direction reaches the end reading position (step S2). If not, the control unit 110 performs control so that the steps of turning on the visible light source 101 (step S3), obtaining (reading) visible-light image information (step S4), turning off the visible light source 101 (step S5), turning on the infrared light source 102 (step S6), obtaining (reading) infrared-light image information (step S7), turning off the infrared light source 102 (step S8), and changing the relative positions of the imaging optical system 107 and the original 103 by one step in the sub-scanning direction (step S9) are repeated until the reading operation in the sub-scanning direction reaches the end reading position ("Yes" in step S2) and the reading ends. Accordingly, both visible-light image information and infrared-light image information can be obtained at high speed in one sub scan.

The present embodiment uses the visible light source 101 including a xenon fluorescent lamp and the infrared light source 102 including an infrared LED array. The xenon fluorescent lamp has a good start-up response, thus allowing stable emission instantaneously. In addition, the xenon fluorescent lamp has high luminous efficiency. The infrared LED array also has a good start-up response.

As described above, in the present embodiment, the operation of turning on the visible light source 101 and the infrared light source 102 is switched at every reading of the main scan by the control unit 110. Furthermore, by changing the relative positions of the imaging optical system 107 and the original 103 in the sub-scanning direction, visible-light image information and infrared-light image information of the original 103 are obtained at high speed by the three-line CCD 108.

Second Exemplary Embodiment

Figure 3:
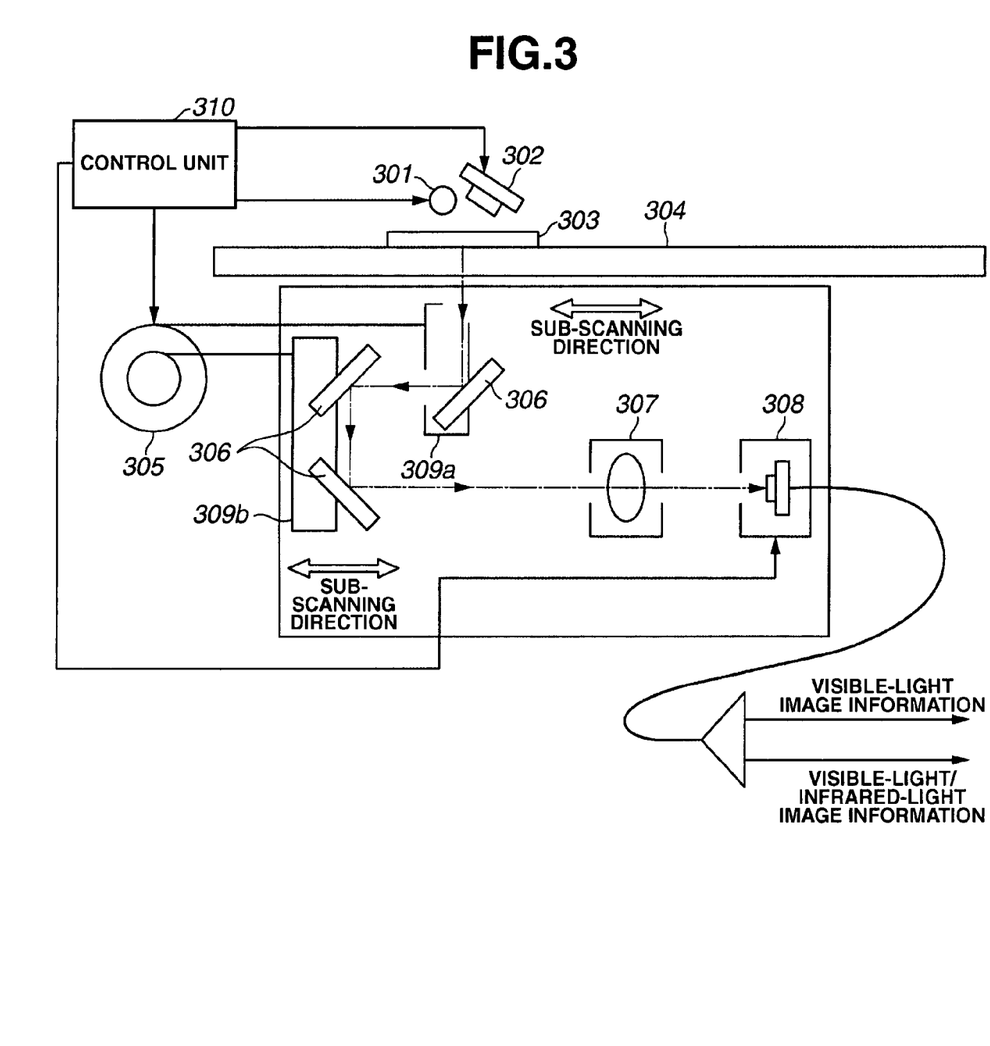
FIG. 3 is a schematic diagram of exemplary portions of an image reading apparatus according to a second embodiment of the present invention.

FIG. 3 is a schematic diagram of exemplary portions of a two-to-one mirror scanning type image reading apparatus (flatbed scanner) according to a second embodiment of the present invention. A visible light source 301 includes a cold cathode fluorescent lamp and emits visible light of wavelength of at least 480 nm to 630 nm. An infrared light source 302 includes an infrared LED array and emits infrared light of which the peak wavelength is between 800 nm and 950 nm. A transmission original (film) 303 is placed on an original holder glass 304.

A plurality of mirrors 306 for bending an optical path bends the optical path of a light flux from the original 303 inside the body of the image reading apparatus. Among the plurality of mirrors 306, a mirror located closest to the original 303 is mounted on a first mirror holder 309a, and two other mirrors are mounted on a second mirror holder 309b. A driving device 305 moves the mirror holders 309a and 309b at their respective speeds in a ratio of 2:1 in the sub-scanning direction.

An imaging optical system 307 includes one or more lens elements and forms image information of the original 303, placed on the original holder glass 304, irradiated by the visible light source 301 and the infrared light source 302 on a read unit 308.

Figure 8:
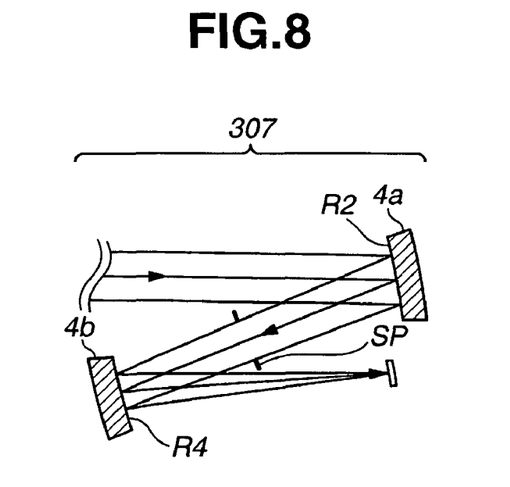
FIG. 8 is a schematic diagram of an exemplary imaging optical system according to the second embodiment of the present invention.

An off-axial reflective optical system, such as that shown in FIG. 8, may be used for the imaging optical system 307 in the present embodiment. The exemplary off-axial reflective optical system shown in FIG. 8 includes first and second reflective off-axial optical elements 4a and 4b made of plastic material located in order from the original 303. The first and second reflective off-axial optical elements 4a and 4b each have an outer shape such that the lengths in the respective orthogonal directions differ from each other and the thickness is smaller than the length in the direction of the shorter side of the outer shape. Respective mirror surfaces (off-axial reflective surfaces) R2 and R4 of the first and second off-axial optical elements 4a and 4b are located to substantially face each other. In particular, the first and second off-axial optical elements 4a and 4b are rectangular and are formed such that the length in the direction of the thickness is smaller than the length in the direction of the short side. In FIG. 8, a stop SP is located between the first off-axial optical element 4a and the second off-axial optical element 4b.

As described above, the off-axial reflective optical system may include a small number of reflective mirrors, thus not generating chromatic aberration. In addition, the whole optical system can easily be manufactured.

The read unit 308 has at least three different spectral sensitivity characteristics and includes a plurality of one-dimensional photoelectric conversion elements (three-line CCD) extending along the main scanning direction. A driving device 305 changes the relative optical positions of the imaging optical system 307 and the original 303 in the sub-scanning direction.

In the above description, "changing the relative optical positions" means changing the optical distance between the original 303 and the imaging optical system 307 by moving the first and second mirror holders 309a and 309b with the original 303 and the imaging optical system 307 fixed.

In the present embodiment, a control unit 310 performs control so as to obtain visible-light image information when the original 303 is irradiated with visible light and visible-light image information and infrared-light image information when the original 303 is irradiated with both visible light and infrared light, from the three-line CCD 308. To obtain such image information, the control unit 310 switches the infrared light source 302 on and off at every reading in the main scanning direction with the visible light source 301 continuously turned on, and changes the relative optical positions of the imaging optical system 307 and the original 303 in the sub-scanning direction once.

Figure 4:
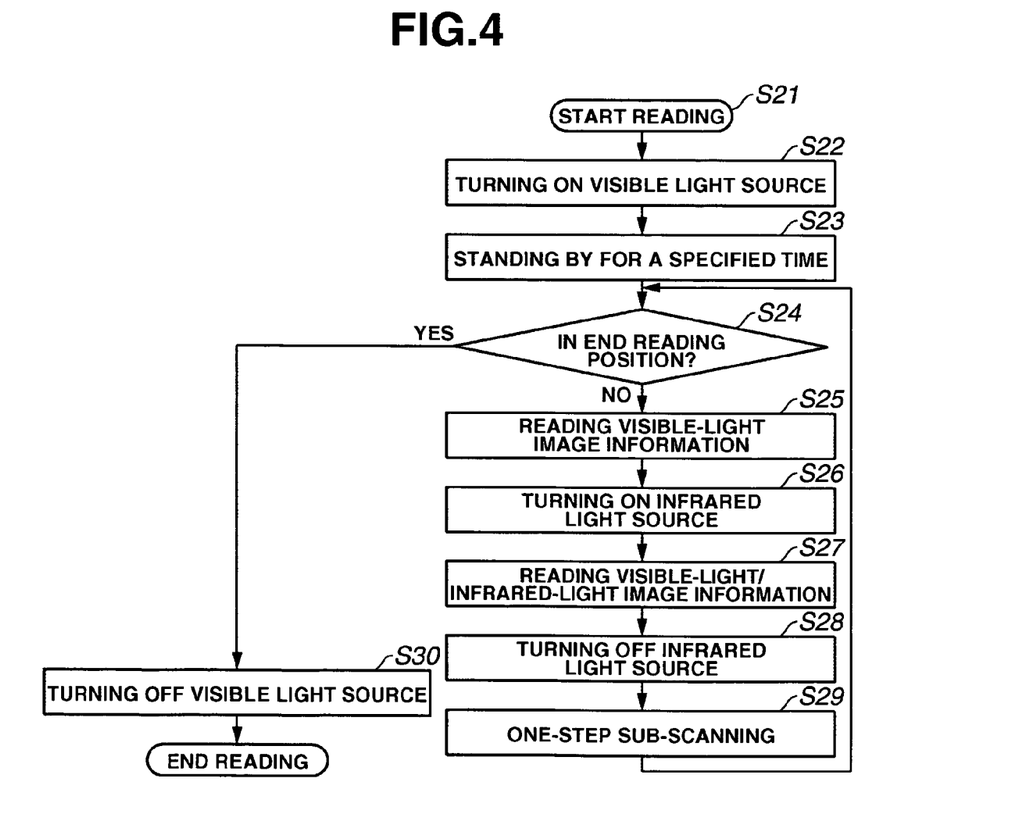
FIG. 4 is a flowchart showing an exemplary operation of the image reading apparatus according to the second embodiment of the present invention.

FIG. 4 is a flowchart illustrating an exemplary operation of the image reading apparatus according to the second embodiment of the present invention. After the reading of the original 103 is started (step S21), the visible light source 301 is turned on (step S22), and the image reading apparatus is set to a standby state for a specified time (step S23). This is to take measures against the slow start-up response of a cold cathode fluorescent lamp as compared to that of a xenon fluorescent lamp employed in the first embodiment.

Next, until the reading in the sub-scanning direction reaches the end reading position (step S24), visible-light image information is obtained (read) (step S25), the infrared light source 302 is turned on without turning off the visible light source 301 (step S26), and visible-light image information and infrared-light image information is obtained (step S27). Subsequently, after the infrared light source 302 is turned off (step S28) and one step of relative movement is made in the sub-scanning direction (step S29), the process returns to step S24. If the reading in the sub-scanning direction has reached the end reading position (step S24), the visible light source 301 is turned off (step S30). Thus, the control unit 310 performs control such that visible-light image information and visible-light image information and infrared-light image information can be obtained in one sub-scan.

The visible-light image information and infrared-light image information contains visible-light image information and infrared-light image information in a composite manner. However, since visible-light image information is obtained separately, infrared-light image information can be obtained by subtracting the visible-light image information from the visible-light image information and infrared-light image information. This process is conducted by a simple calculation, so that it does not burden subsequent image processing (not shown) and does not greatly affect processing time or production cost.

As described above, the present embodiment uses the visible light source 301 including a cold cathode fluorescent lamp and the infrared light source 302 including an infrared LED array. The start-up response of the cold cathode fluorescent lamp is slow as compared to that of a xenon fluorescent lamp. However, the cold cathode fluorescent lamp is advantageous in that the luminous efficiency is extremely high and that the cold cathode fluorescent lamp can easily be manufactured (at low cost). Therefore, the second embodiment, which has taken measures against the start-up response, can improve the signal-to-noise ratio of an image using a large amount of visible light, reduce power consumption, and lower manufacturing cost.

Third Exemplary Embodiment

Figure 5:
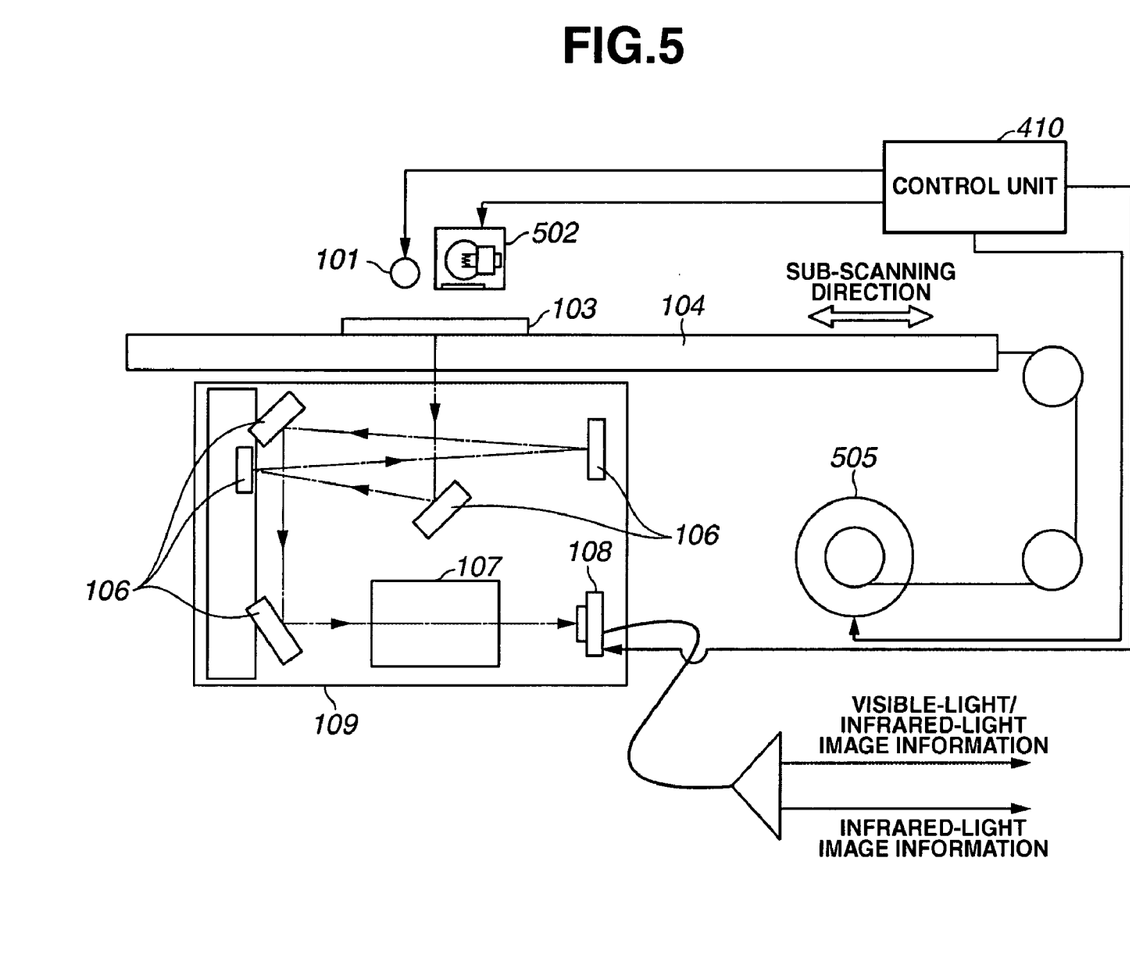
FIG. 5 is a schematic diagram of exemplary portions of an image reading apparatus according to a third embodiment of the present invention.

FIG. 5 is a schematic diagram of exemplary portions of an integrated-carriage-type image reading apparatus (a flatbed scanner) according to a third embodiment of the present invention. In FIG. 5, the same reference numerals are assigned to elements that are similar to those shown in FIG. 1.

The third embodiment differs from the first embodiment in that an infrared light source 502 is configured by a halogen light source coupled with a visible-light cut filter made of silicon, and that the turning-on and turning-off operations of the visible light resource 101 and the infrared light source 502 are set different from those of the first embodiment. Other configurations and optical operations are almost similar to those of the first embodiment, so that similar effects can be achieved.

The infrared light source 502 emits infrared light that has a peak wavelength between the wavelengths of 800 nm to 950 nm. A driving device 505 moves the carriage 109 (the imaging optical system 107) and the original 103 relative to each other in the sub-scanning direction.

The imaging optical system 107 in the present embodiment can be configured by an image forming lens system that contains a diffractive optical element surface. A diffractive optical element surface has an extremely strong chromatic aberration correction effect. Thus, chromatic aberration can easily be corrected even outside a visible light range by incorporating a diffractive optical element surface into a conventional refractive optical system.

In the present embodiment, a control unit 410 performs control so as to obtain, at high speed, both infrared-light image information when the original 103 is irradiated with infrared light and visible-light image information and infrared-light image information when the original 103 is irradiated with both visible light and infrared light, from the three-line CCD 108. To obtain such image information, the control unit 410 switches the visible light source 101 on and off at every reading in the main scanning direction with the infrared light source 502 continuously turned on, and changes the relative optical positions of the carriage 109 (the imaging optical system 107) and the original 103 in the sub-scanning direction once.

Figure 6:
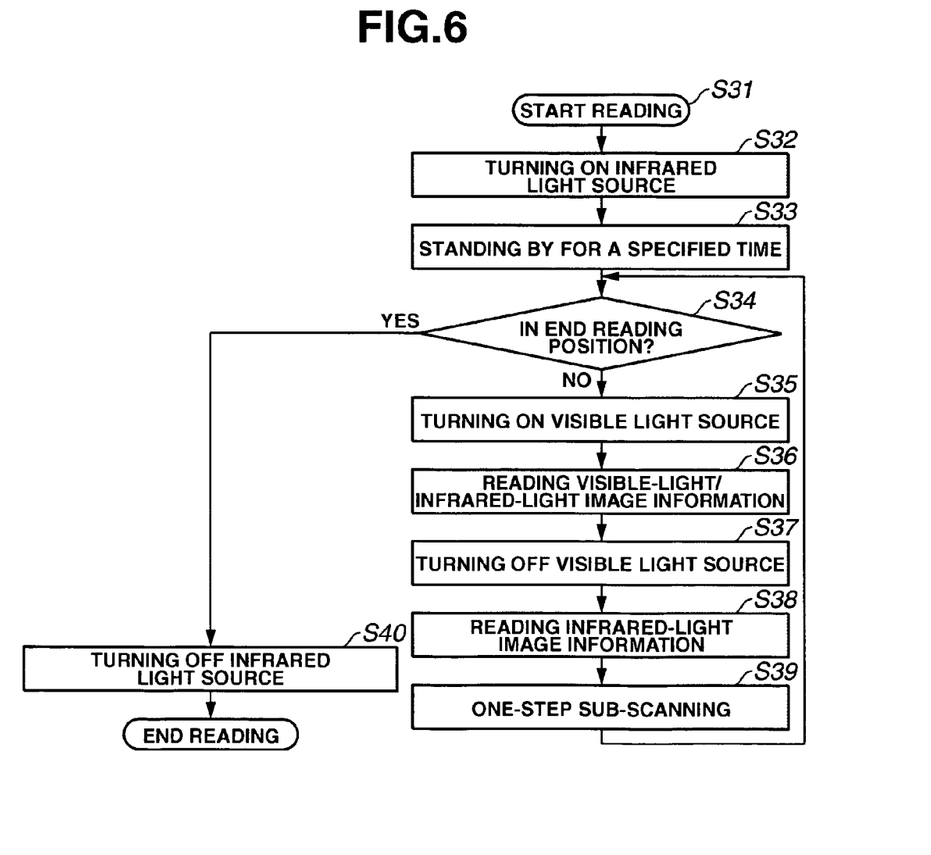
FIG. 6 is a flowchart showing an exemplary operation of the image reading apparatus according to the third embodiment of the present invention.

FIG. 6 is a flowchart illustrating an exemplary operation of the image reading apparatus according to the third embodiment of the present invention. After the reading of the original 103 is started (step S31), the infrared light source 301 is turned on (step S32), and the image reading apparatus is set to a standby state for a specified time (step S33). This is to take measures against the slow start-up response of a halogen lamp as compared to that of a xenon fluorescent lamp employed in the first embodiment. Next, until the reading in the sub-scanning direction reaches the end reading position (step S34), the visible light source 101 is turned on (step S35), and visible-light image information and infrared-light image information is obtained (step S36). Subsequently, the visible light source 101 is turned off (step 37), and infrared-light image information is obtained (step S38). After one step of relative movement is made in the sub-scanning direction (step S39), the process returns to step S34, and the visible light source 301 is turned on (step S35). If the reading in the sub-scanning direction has reached the end reading position (step 34), the infrared light source 502 is turned off (step S40). Thus, the control unit 410 performs control such that visible-light image information and infrared-light image information and visible-light image information can be obtained in one sub-scan.

The visible-light image information and infrared-light image information contains visible-light image information and infrared-light image information in a composite manner. However, since infrared-light image information is obtained separately, visible-light image information can be obtained by subtracting the infrared-light image information from the visible-light image information and infrared-light image information. This process is conducted by a simple calculation, so that it does not burden subsequent image processing (not shown) and does not greatly affect processing time or product cost.

As described above, the present embodiment uses the infrared light source 502 including a halogen lamp and a visible-light cut filter made of silicon. The start-up response of the halogen lamp is slow as compared to that of an infrared LED. However, the halogen lamp is advantageous in that the structure is simple and a large amount of light can easily be obtained. Therefore, the third embodiment, which takes measures against the start-up response, can be applied to the case where the signal-to-noise ratio of infrared-light image information is to be improved as much as possible, such as the case of reading an image from an original surface on which conspicuous foreign matters or flaws exist.

The configuration of an image reading apparatus according to the present invention is not limited to the embodiments described above. For example, the present invention is effective in the use of a reflective original instead of a transmission original such as film. The present invention can also be implemented in the same way as in the above-described embodiments by using, as a line sensor instead of a three-line CCD, a six-line CCD with every two lines of the same color, a four-line CCD in which an improvement in the color separation performance of four or more colors is made, or a CMOS (complementary metal-oxide semiconductor) sensor.

Figure 9:
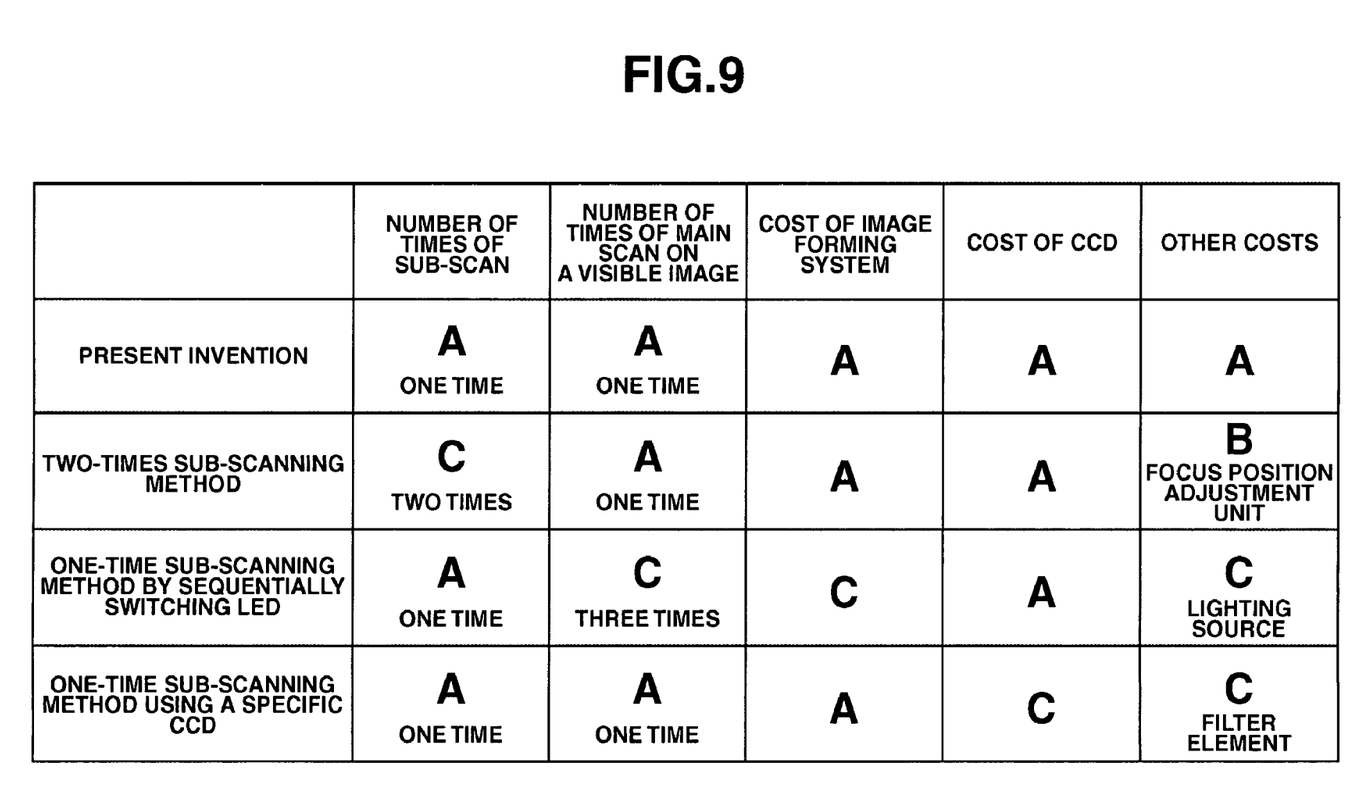
FIG. 9 illustrates a table showing a comparison between the features of an image reading apparatus according an embodiment of the present invention and of conventional image reading apparatuses.

FIG. 9 illustrates a table showing a comparison between the features of an image reading apparatus according an embodiment of the present invention and of conventional image reading apparatuses. Each feature is marked "A" when it is superior, "C" when it is inferior, and "B" when it is on the same level. As apparent from FIG. 9, the embodiment is well-balanced in optical performance and manufacturing cost as compared to any of the conventional apparatuses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-153932 filed May 26, 2005, which is hereby incorporated by reference herein in its entirety.

What is claimed:

1. An image reading apparatus comprising:
    a visible light source configured to emit visible light;
    an infrared light source configured to emit infrared light which is separate from the visible light source;
    a single read unit comprising at least three one-dimensional photoelectric conversion elements extending along a main scanning direction and having respective different spectral sensitivity characteristics;
    an imaging optical system configured to form an image of image information from an original irradiated by the visible and infrared light sources on the read unit; and
    a control unit configured to repeat performing a first operation of obtaining visible-light image information of the original while turning on the visible light source with the infrared light source turned off and a second operation of obtaining infrared-light image information of the original while turning on the infrared light source with the visible light source turned off, at every reading in the main scanning direction and changing relative positions of the imaging optical system and the original by one step in a sub scanning direction, wherein each of the at least three one-dimensional photoelectric conversion elements has spectral sensitivity characteristics for the visible light and the infrared light;

wherein the first operation and the second operation is performed in separate timings.

2. The image reading apparatus according to claim 1, wherein the imaging optical system includes an off-axial reflection surface.

3. The image reading apparatus according to claim 1, wherein the imaging optical system includes a diffractive optical element and a refractive optical element, and the diffractive optical element has a function to correct chromatic aberration that occurs in the refractive optical element.

4. The image reading apparatus according to claim 1, wherein the visible light source and the infrared light source are separate individual light sources from each other and not being from a single common light source.

5. An image reading apparatus comprising:

a visible light source configured to emit visible light;

an infrared light source configured to emit infrared light which is separate from the visible light source;

a single read unit comprising at least three one-dimensional photoelectric conversion elements extending along a main scanning direction and having respective different spectral sensitivity characteristics;

an imaging optical system configured to form an image of image information of an original irradiated by the visible and infrared light sources on the read unit;

a driving unit configured to change relative positions of the imaging optical system and the original in a sub-scanning direction; and a control unit configured to repeat performing a first operation of obtaining visible-light image information and infrared-light image information while turning off the infrared light source with the visible light source turned on, at every reading in the main scanning direction and changing relative positions of the imaging optical system and the original by one step in a sub scanning direction, and a second operation of obtaining infrared-light image information based on the obtained visible-light image information and infrared-light image information and the obtained visible-light information, wherein each of the last three one-dimensional photoelectric conversion elements has spectral sensitivity characteristics for the visible light and the infrared light;

wherein the first operation and the second operation is performed in separate timings.

6. The image reading apparatus according to claim 5, wherein the imaging optical system includes an off-axial reflection surface.

7. The image reading apparatus according to claim 5, wherein the imaging optical system includes a diffractive optical element and a refractive optical element, and the diffractive optical element has a function to correct chromatic aberration that occurs in the refractive optical element.

8. The image reading apparatus according to claim 5, wherein the visible light source and infrared light source are separate individual light sources from each other and not being from a single common light source.

9. An image reading apparatus comprising:

a visible light source configured to emit visible light;

an infrared light source configured to emit infrared light which is separate from the visible light source;

a single read unit comprising at least three one-dimensional photoelectric conversion elements extending along a main scanning direction and having respective different spectral sensitivity characteristics;

an imaging optical system configured to form an image of image information of an original irradiated by the visible and infrared light sources on the read unit;

a driving unit configured to change relative positions of the imaging optical system and the original in a sub-scanning direction; and a control unit configured to repeat performing a first operation of obtaining infrared-light image information from the original while turning off the visible light source with the infrared light source turned on and a second operation of obtaining visible-light information and infrared-light information while turning on the visible light source with the infrared light source turned on, at every reading in the main scanning direction and changing relative positions of the imaging optical system and the original by one step in a sub scanning direction, and to obtain visible-light image information based on the obtained visible-light image information and infrared-light image information and the obtained infrared-light image information, wherein each of the at least three dimensional photoelectric conversion elements has spectral sensitivity characteristics for the visible light and the infrared light;

wherein the first operation and the second operation is performed in separate timings.

10. The image reading apparatus according to claim 9, wherein the imaging optical system includes an off-axial reflection surface.

11. The image reading apparatus according to claim 9, wherein the imaging optical system includes a diffractive optical element and a refractive optical element, and the diffractive optical element has a function to correct chromatic aberration that occurs in the refractive optical element.

12. The image reading apparatus according to claim 9, wherein the visible light source and infrared light source are separate individual light sources from each other and not being from a single common light source.

* * * * *